United States Patent
Kim

(12) United States Patent (10) Patent No.: US 7,606,331 B2
Kim (45) Date of Patent: Oct. 20, 2009

(54) FREQUENCY OFFSET COMPENSATION IN RADIO RECEIVER

(75) Inventor: Kyeong Jin Kim, Irving, TX (US)

(73) Assignee: Nokia Corporation, Espoo (FI)

( * ) Notice: Subject to any disclaimer, the term of this patent is extended or adjusted under 35 U.S.C. 154(b) by 573 days.

(21) Appl. No.: 11/126,400

(22) Filed: May 11, 2005

(65) Prior Publication Data

US 2006/0256894 A1 Nov. 16, 2006

(51) Int. Cl.
H04L 27/00 (2006.01)

(52) U.S. Cl. ...................................... 375/326

(58) Field of Classification Search ................. 375/260, 375/267, 324, 326, 355; 370/208, 503
See application file for complete search history.

(56) References Cited

U.S. PATENT DOCUMENTS

| | | | | |
|---|---|---|---|---|
| 6,891,792 | B1 * | 5/2005 | Cimini et al. ............... | 370/206 |
| 6,993,094 | B1 * | 1/2006 | Eberlein et al. ............ | 375/326 |
| 7,039,132 | B1 * | 5/2006 | Chen et al. ................... | 375/334 |
| 7,203,255 | B2 * | 4/2007 | Wang et al. .................. | 375/340 |
| 2002/0181615 | A1 * | 12/2002 | Kuzminskiy et al. ........ | 375/316 |

OTHER PUBLICATIONS

Kim et al, "Joint Detection and Channel Estimation Algorithms for QS-CDMA Signals Over Time-Varying Channels", IEEE Transactions on Communications, vol. 50, No. 5, May 2002, pp. 845-855.
Ito et al, "Gaussian Filters for Nonlinear Filtering Problems", IEEE Transactions on Automatic Control, vol. 45, No. 5, May 2000, pp. 910-927.
Kotecha et al., "Gaussian Sum Particle Filtering for Dynamic State Space Models", Proceedings of IEEE International Conference on Acoustics, Speech, and Signal Processing, May 2001, pp. 3465-3468.
Kim et al, "A Sequential Monte-Carlo Kalman Filter based Delay and Channel Estimation Method in the MIMO-OFDM System", Proceedings of IEEE Vehicular Technology Conference, 2004.
Wan et al, "The Unscented Kalman Filter for Nonlinear Estimation", Proceedings of IEEE Adaptive Systems for Signal Processing, Communications, and Control Symposium, pp. 153-158, Oct. 2000.
Kyeong Jin Kim (Nokia Research Center), Ronald A. Iltis (Telemetry Laboratory), "Integration Based Frequency Offset Estimate for the MIMO-OFDM System", 2005, pp. 805-808.
Kazufumi Ito, et al., "Gaussian Filters for Nonlinear Filtering Problems", May 2000, pp. 910-927.

* cited by examiner

*Primary Examiner*—Khanh C Tran
(74) *Attorney, Agent, or Firm*—Alston & Bird LLP

(57) ABSTRACT

A solution for estimating frequency offset in a radio telecommunication system is provided. According to the solution, an estimate for frequency offset between a radio frequency carrier wave of a received signal and frequency of a local oscillator used for downconverting the received signal in a receiver is calculated by utilizing an approximation of Gauss-Hermite integration. Parameters of the receiver are adjusted according to the frequency offset estimate in order to retrieve information from the received signal.

17 Claims, 3 Drawing Sheets

FREQUENCY OFFSET COMPENSATION IN RADIO RECEIVER

FIELD

The invention relates to estimation of frequency offset of a received information signal in a communication system.

BACKGROUND

Multicarrier technologies have recently been a subject of research. Orthogonal frequency division multiplexing (OFDM) technology has been utilized in wireless local area network (WLAN) systems (IEEE 802.11 standard). The point in OFDM is to multiplex a high data rate information signal into several low data rate subcarrier signals for transport over a radio channel. An advantage of this technology is that frequency selective fading of an information signal can be effectively avoided, since each subcarrier experiences relatively flat fading.

Other multicarrier technologies have been topics of intense study. Such technologies include multicarrier code division multiple access (MC-CDMA) technology, multicarrier direct sequence (DS) CDMA technology, and multitone (MT) CDMA technology. Utilization of one or several of these technologies for example in a fourth generation mobile telecommunication system has been studied.

A disadvantage of multicarrier systems, and especially OFDM systems, is their sensitivity to frequency-offset errors of subcarriers. Frequency offset results in intercarrier interference (ICI) at demodulator outputs. Frequency offset may be caused by a mismatch of local oscillators in a transmitter and a receiver. The mismatch is due to non-idealities of the oscillators. Additionally, frequency offset of subcarriers is also introduced in a radio channel, where the offset may be caused for example by a Doppler frequency shift, which is often present in mobile communication environments.

In order to negate or minimize effects of frequency offset, a frequency-offset synchronization is essential in a receiver. Usually, frequency-offset synchronization is implemented using a frequency offset estimation algorithm providing an estimate of the frequency offset. The local oscillator of the receiver is then adjusted according to the frequency offset estimate.

Known algorithms for estimating frequency-offset errors include an extended Kalman filter (EKF), which is a recently established algorithm. The extended Kalman filter is a first order, non-linear filter, whose estimation accuracy depends mainly on the stability of a Jacobian matrix. For example, in the presence of large Doppler spread, the Jacobian matrix may become numerically unstable, which is why the estimate produced by the EKF may diverge. Therefore, more powerful non-linear filters such as a Gaussian sum particle filter, a particle EKF (PEKF), and unscented Kalman filter (UKF) have been proposed. Particle filter based structures, however, still require the Jacobian matrix, and the UKF performs poorer than the EKF in general.

Further information on the EKF can, if necessary, be obtained in literature, for instance in Kim Kyeong Jin et al: Joint Detection and Channel Estimation Algorithms for QS-CDMA Signals Over Time-Varying Channels, IEEE Transactions on Communications, vol. 50, pp. 845-855, May 2002. More information on the Gaussian sum particle filter can be obtained in Kotecha J. H. et al: Gaussian Sum Particle Filtering for Dynamic State Space Models, Proceedings of IEEE International Conference on Acoustics, Speech, and Signal Processing 2001, pp. 3465-3468, May 2001. More information on the PEKF can be obtained in Kim Kyeong Jin et al: A Sequential Monte-Carlo Kalman Filter based Delay and Channel Estimation Method in the MIMO-OFDM System, Proceedings of IEEE Vehicular Technology Conference, 2004. More information on the unscented Kalman filter can be obtained in Wan E. A. et al: The Unscented Kalman Filter for Nonlinear Estimation, Proceedings of IEEE Adaptive Systems for Signal Processing, Communications, and Control Symposium, pp. 153-158, October 2000. These publications are incorporated herein by reference.

BRIEF DESCRIPTION OF THE INVENTION

An object of the invention is to provide an improved solution for estimating frequency offset in a radio telecommunication system.

According to an aspect of the invention, there is provided a method for estimating frequency offset in a radio telecommunication system. The method implemented in a radio receiver comprises receiving a signal transmitted over an air interface, calculating, by utilizing an approximation of Gauss-Hermite integration, an estimate for frequency offset between a radio frequency carrier wave of the received signal and frequency of a local oscillator used for downconverting the received signal in the receiver and adjusting parameters of the receiver according to the frequency offset estimate in order to retrieve information from the received signal.

According to another aspect of the invention, there is provided a radio receiver which comprises a communication interface for receiving an information signal transmitted over an air interface and a control unit configured to calculate, by utilizing an approximation of Gauss-Hermite integration, from the received signal an estimate for frequency offset between a radio frequency carrier wave of the received signal and frequency of a local oscillator used for downconverting the received signal in the receiver and adjust parameters of the receiver according to the frequency offset estimate in order to retrieve information from the received signal.

According to another aspect of the invention, there is provided a computer program product encoding a computer program of instructions for executing a computer process for estimating frequency offset in a radio telecommunication system. The process comprises receiving a signal transmitted over an air interface, calculating, by utilizing an approximation of Gauss-Hermite integration, from the received signal an estimate for frequency offset between the radio frequency carrier wave of the received signal and frequency of local oscillator which is used for downconverting the received signal in the receiver and adjusting parameters of the receiver according to the frequency offset estimate in order to retrieve information from the received signal.

According to another aspect of the invention, there is provided a computer program distribution medium readable by a computer and encoding a computer program of instructions for executing a computer process for estimating frequency offset in a radio telecommunication system. The process comprises receiving a signal transmitted over an air interface, calculating, by utilizing an approximation of Gauss-Hermite integration, from the received signal an estimate for frequency offset between the radio frequency carrier wave of the received signal and frequency of local oscillator which is used for downconverting the received signal in the receiver and adjusting parameters of the receiver according to the frequency offset estimate in order to retrieve information from the received signal.

An advantage provided by the invention is a better accuracy for a frequency offset estimate. The implementation of directly functional approximation of the Gauss-Hermite integration into the frequency offset estimation procedure yields more reliable estimates, which is due to carrying out the estimation procedure without a need to compute the potentially unstable Jacobian matrix.

LIST OF DRAWINGS

In the following, the invention will be described in greater detail with reference to the embodiments and the accompanying drawings, in which FIG. 1 shows an exemplary structure of a communication system according to an embodiment of the invention;

DESCRIPTION OF EMBODIMENTS

Figure 1:
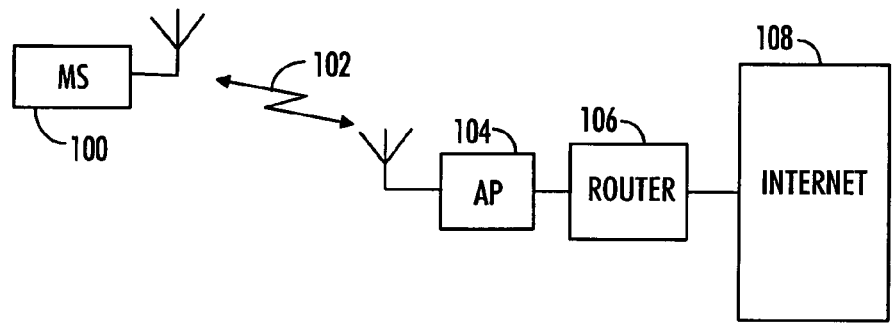

With reference to FIG. 1, examine an example of a data transmission system whereto embodiments of the invention can be applied. A mobile communication unit 100 is connected with an access point 104 via an air interface 102. The connection 102 between the mobile communication unit 100 and the access point 104 may be a WLAN connection, for example. The connection 102 may also be implemented using any other mobile communication technology.

The access point 104 may be a base transceiver station, for example. The access point is further connected to a router unit 106, which takes care of forwarding data packets from one network to another, based on network-layer information and a routing table. The connection between the access point 104 and the router unit 106 is typically fixed. In this example, the router unit 106 is further connected to the Internet 108, but it may also be connected to other communication networks.

Figure 2:
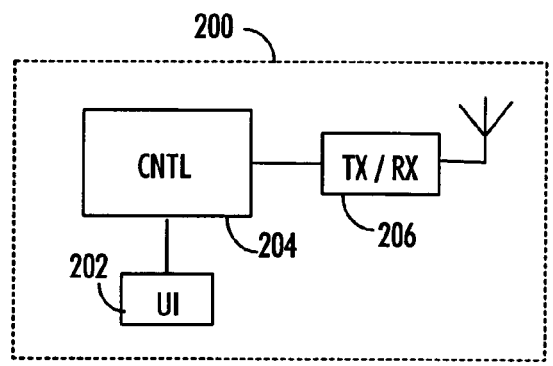
FIG. 2 illustrates an exemplary structure of a radio receiver according to an embodiment of the invention.

Next, a structure of a radio receiver according to an embodiment of the invention will be described with reference to FIG. 2. The radio receiver 200 may for example be a mobile transceiver unit, a computer, a laptop, or a PDA (Personal Digital Assistant). The radio receiver 200 may also be a combination of two electronic devices, such as a computer with a mobile transceiver unit connected to the computer. An example of a combination of a PDA and a mobile transceiver unit is the Nokia Communicator®. The radio receiver 200 may also be a network element, such as a base transceiver station of a communication system or a WLAN access point.

The radio receiver 200 comprises a communication interface 206 to enable reception of radio signals. The radio signals may be transmitted by using any suitable radio access technology. The radio access technology may be a multicarrier radio access technology, such as OFDM, MC-CDMA, MC-DS-CDMA, or MT-CDMA radio access technology.

The radio receiver 200 comprises a control unit 204 to control functions of the device 200. The control unit 204 comprises means for controlling reception of radio signals The control unit 204 further comprises means for retrieving information from a received signal. The retrieval procedure may comprise calculation of parameters of the received signal and adjusting operation of other receiver components based on those parameters. The control unit 204 may be implemented with a digital signal processor with suitable software or with separate logic circuits, for example with ASIC (Application Specific Integrated Circuit). The control unit 204 may also be a combination of these two implementations, such as a processor with suitable software embedded within an ASIC. The radio receiver 200 may comprise multiple control units.

The radio receiver 200 may further comprise a user interface 202 connected to the controlling unit 204. The user interface 202 comprises means for inputting information into the electronic device, as well as means for outputting information. The user interface 202 may comprise a keyboard, a microphone, a loudspeaker, a display, and/or a camera.

Figure 3:
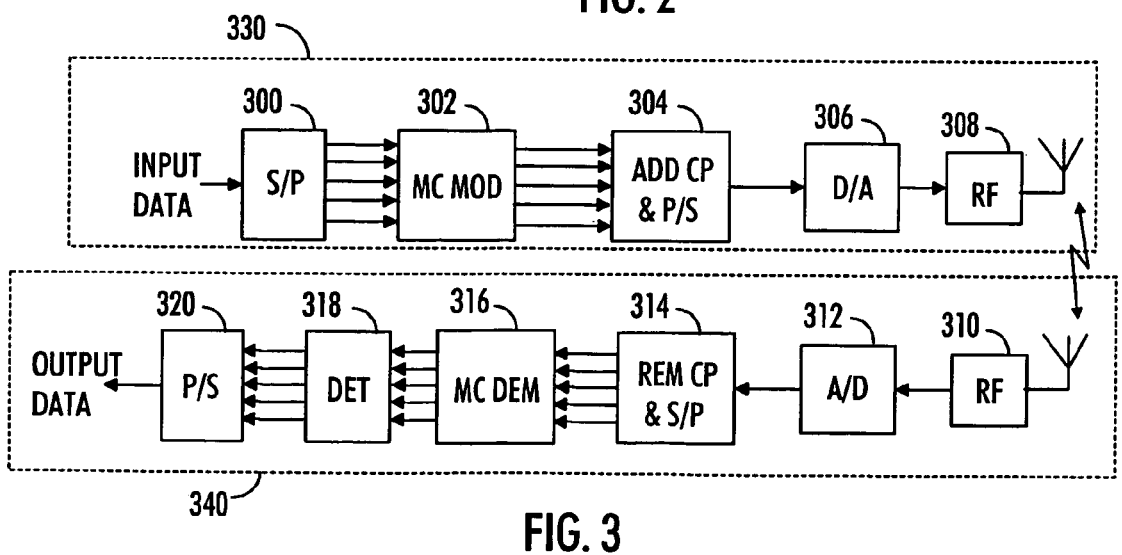
FIG. 3 illustrates an exemplary structure of a transmitter and a receiver according to an embodiment of the invention.

Next, structures of a transmitter and a receiver communicating with each other using a multicarrier technology are described with reference to FIG. 3. As an example of multicarrier technology, an OFDM technology is described, but it should be appreciated that the invention is not limited to OFDM technology.

In the transmitter 330, a serial-to-parallel converter 300 receives a high data rate bit stream, which it converts into several parallel, lower data rate signals. The number of parallel signals may be equal to or smaller than the number of subcarriers determined to be used.

A multicarrier modulator 302 receives the parallel signals and performs primary modulation on them using for example quadrature amplitude modulation (QAM) or phase shift keying (PSK) modulation. Furthermore, the multicarrier modulator assigns a different subcarrier to each parallel signal, i.e. performs multicarrier modulation. The assignment may be implemented using for example an inverse discrete Fourier transform. The number of parallel signals determines the length of the inverse discrete Fourier transform. For example, if there are 16 parallel signals, a 16-point inverse discrete Fourier transform is calculated, and the operation results in 16 orthogonal baseband subcarriers with each subcarrier carrying a modulated information signal. The inverse discrete Fourier transform may be implemented using a fast Fourier transform algorithm, for example.

Next, a so-called cyclic prefix is added to each symbol on a subcarrier signal, and the parallel signals are converted into a serial form in add cyclic prefix and convert parallel to serial block 304. A cyclic prefix is used in order to avoid intersymbol interference caused by the multipath propagation of a signal in a radio channel.

A digital-to-analog converter 306 converts the input digital signal into analog waveforms, and feeds the analog signal to radio frequency (RF) components 308, which comprise a mixer, a filter and an amplifier. The mixer converts the baseband signal to a desired RF band, the filter removes undesired frequency components, and the amplifier amplifies the RF signal for transmission over the radio channel through an antenna.

In a receiver 340, the radio frequency signal is received from the radio channel through an antenna. RF components 310 of the receiver 340 comprise an amplifier, a filter and a mixer. The amplifier amplifies the received signal to a desired power level, the filter removes undesired frequency components, and the mixer converts the RF signal to baseband. The downconverted signal may be lowpass filtered in order to remove undesired frequency components resulting in the downconverting operation.

The baseband analog signal is converted into a digital form in an analog-to-digital converter 312. The cyclic prefix is removed and the serial form information signal is converted into a parallel form in remove cyclic prefix and convert serial to parallel block 314. The number of parallel signals again depends on the number of subcarriers.

A multicarrier demodulator 316 removes the multicarrier modulation and the primary modulation resulting in parallel signals, which each comprise information signals corrupted with noise and other interference caused by the radio channel and non-idealities of the components used in the transmitter and the receiver. The multicarrier modulation may be removed using a discrete Fourier transform, and it may be implemented using a fast Fourier transform algorithm. The primary modulation may be removed using, for example, a correlator or a matched filter based demodulator.

A detector 318 makes bit decisions for each received, parallel signal. Finally, the parallel signals are converted into a high data rate bit stream in a parallel-to-serial converter 320.

Figure 4:
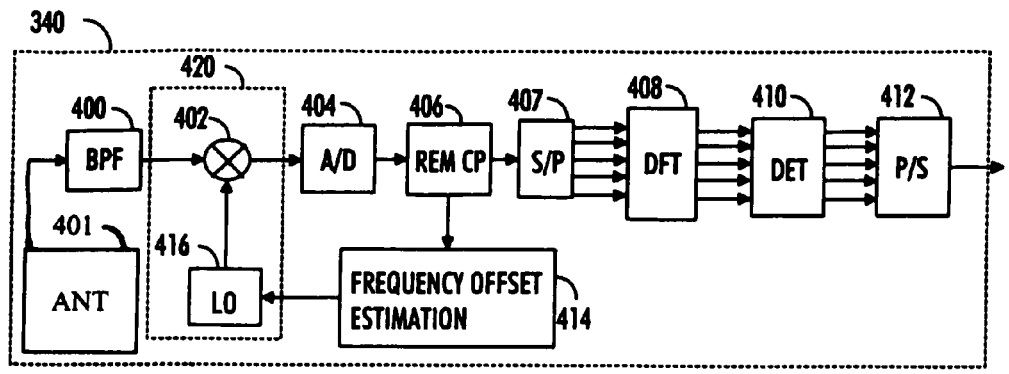
FIG. 4 illustrates an exemplary block diagram of a receiver structure according to an embodiment of the invention.

FIG. 4 illustrates a more detailed structure of the receiver 340. A bandpass filter 400 removes unnecessary frequency components from the radio frequency signal received from the channel. One or more antennas 401 precede the bandpass filter 400. An amplifier and/or other RF components may also precede the bandpass filter 400.

A mixer 420 downconverts the RF signal to baseband. The mixer 420 comprises a multiplier 402 and a local oscillator 416. The multiplier 402 simply multiplies the two input signals, i.e. the RF information signal and the signal from the local oscillator, producing a downconverted baseband information signal and additional frequency components due to intermodulation of RF carrier wave of the information signal and the local oscillator signal.

The local oscillator 416 produces a signal approximating the carrier wave of the information signal. Due to mismatch between the local oscillator in the transmitter 330 and the local oscillator 416 in the receiver 340, the signals produced by these oscillators are not identical. Additionally, the radio channel introduces some frequency offset into the information signal and thus the mismatch between the local oscillator 416 signal and the actual carrier wave signal is even greater. This results in intermodulation of these two signals, which causes intercarrier interference between the subcarriers of the multicarrier information signal. In order to reduce this effect, the local oscillator 416 is controlled by a frequency offset estimator 414, which estimates the frequency offset between the local oscillator 416 signal and the carrier wave of the information signal and adjusts the parameters of the local oscillator 416 accordingly.

A lowpass filter may follow the mixer 420 in order to remove undesired frequency components outside the band on which the information signal resides.

An analog-to-digital converter 404 converts the analog base-band information signal into a digital form. This digitized signal is fed to cyclic prefix removing block 406. After the removal of the cyclic prefix, the signal may be fed to the frequency offset estimator 414, as well as to the serial-to-parallel converter 407, the signal still in a serial form.

The following blocks have similar functionalities as described above with reference to the receiver 340 of FIG. 3. A multicarrier demodulator 408 removes the multicarrier modulation and the primary modulation, a detector 410 makes bit decisions, and a parallel-to-serial converter 412 converts the parallel bit streams into a higher data rate serial bit stream.

Figure 5:
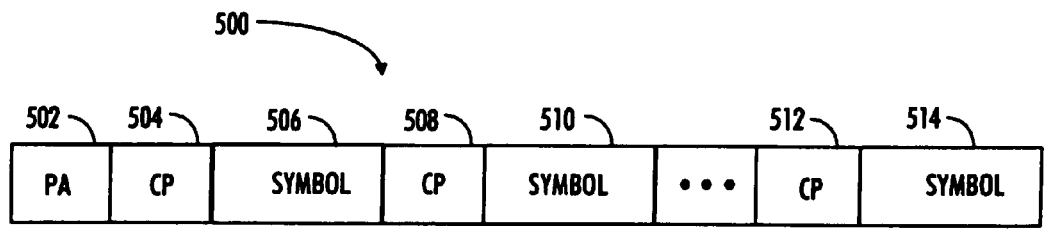
FIG. 5 illustrates an example of a data packet format in a communication system according to an embodiment of the invention.

FIG. 5 illustrates an example of a data packet format in a communication system according to an embodiment of the invention. A data packet 500 comprises a preamble symbol interval 502, cyclic prefix symbol intervals 504, 508, 512 and data symbol intervals 506, 510, 514. There may be one preamble interval and several cyclic-prefix-data-symbol-interval combinations per data packet.

The preamble symbol interval 502 is used for synchronization and parameter estimation purposes. A preamble is a sample sequence known both in the transmitter and the receiver.

As mentioned above, cyclic prefix symbol intervals 504, 508, 512 are used for cancelling intersymbol interference caused by the multipath propagation of a radio signal in a radio channel. The cyclic prefix interval is usually designed to be longer than an assumed delay spread of the radio channel in order to cancel the intersymbol interference completely. Contents of the cyclic prefix may be copied from a portion of samples in the data symbol interval, e.g. a certain amount of the last symbols in the data symbol.

The contents of the data symbol intervals 506, 510, 514 comprise samples related to a data symbol specific to the communication system. Usually, one data symbol interval comprises samples of one data symbol.

Next, an example of a frequency offset estimation procedure performed by the frequency offset estimator 414 according to an embodiment of the invention will be described in detail. The frequency offset estimator 414 may calculate a frequency offset estimate from a digitized preamble of a received information signal. The frequency offset estimator 414 may utilize a so-called Gauss-Hermite filter in the process. More information on the Gauss-Hermite filter can be found in Ito K et al. "Gaussian Filters for Nonlinear Filtering Problems" IEEE transactions on automatic control, vol. 45, pp. 910-927, 2000, which has been incorporated herein as a reference. Gauss-Hermite integration and Gauss-Hermite filters have previously been used in theoretical field, particularly in control theory.

A received preamble signal comprises a number of samples, and the signal may be described in a vector form $\hat{y}^N = \{y(1), y(2), \ldots, y(N)\}$, and y(n) is the received signal sample vector received at instant n. First, initial values are set for frequency offset estimate $\hat{\epsilon}$ and probability metric $P_\epsilon$ as $$\hat{\epsilon}(0) = \hat{\epsilon}(0|0), P_\epsilon(0) = P_\epsilon(0|0).$$

Then, for each N preamble samples, an estimate is calculated for both frequency offset and probability metric by taking into account the previously calculated frequency offset estimate and probability metric. The calculation is performed by applying a directly functional approximation of Gauss-Hermite integration, and as a result an estimate for the frequency offset is obtained as $$\hat{\varepsilon}(n|n) = \hat{\varepsilon}(n|n-1) + \frac{\sqrt{2P_\varepsilon(n|n-1)} \sum_{i=1}^{N} w_i \varepsilon_i(n) f_1(\tilde{\varepsilon}_i(n))}{\sum_{j=1}^{N} w_j f_1(\varepsilon_j(n))}.$$

For the probability metric, the following equation is calculated:

$$P_\varepsilon(n|n) = 2P_\varepsilon(n|n-1)\left(\frac{\sum_{i=1}^{N} w_i \varepsilon_i(n)^2 f_1(\tilde{\varepsilon}_i(n))}{\sum_{j=1}^{N} w_j f_1(\tilde{\varepsilon}_j(n))} - \left(\frac{\sum_{i=1}^{N} w_i \varepsilon_i(n)^2 f_1(\tilde{\varepsilon}_i(n))}{\sum_{j=1}^{N} w_j f_1(\tilde{\varepsilon}_j(n))}\right)^2\right).$$

In the above equations, $\varepsilon_i(n)$ and $w_i$ are the $i^{th}$ zero of a Hermite polynomial and its corresponding weight, respectively. Additionally, $$\hat{\varepsilon}(n|n-1) = \alpha_\varepsilon \hat{\varepsilon}(n-1|n-1), \quad P_\varepsilon(n|n-1) = \alpha_\varepsilon^2 P_\varepsilon(n-1|n-1) + q_\varepsilon,$$

where $\alpha_\varepsilon$ is a constant coefficient which is a radio channel property known by the frequency offset estimator 414 as well as $q_\varepsilon$. Here, $\alpha_\varepsilon$ is a modeling parameter for the frequency offset and $q_\varepsilon$ is a constant specifying the variance of the modeling. Preferably, $\alpha_\varepsilon$ is in the range of $0 \leq \alpha_\varepsilon \leq 1$. Also, $$f_1(\varepsilon(n)) = \frac{1}{(2\pi N_0/T_s)^{KN_rT_s}} e^{-\frac{\|y(n) - \tilde{\Delta}(\varepsilon(n))\tilde{D}(n)f(n)\|^2}{2N_0/T_s}}, \text{ and}$$

$$\tilde{\varepsilon}_i(n) = \hat{\varepsilon}(n|n-1) + \sqrt{2P_\varepsilon(n|n-1)}\,\varepsilon_i(n),$$

where $N_0$ is noise level of radio channel, $T_s$ is sampling time of the receiver, K is the number of subcarriers in the received signal, and $N_r$ is the number of antennas 401 employed in the receiver 340. $\tilde{\Delta}(\varepsilon(n))$ is normalized frequency offset, $\tilde{D}(n)$ is a known transmitted data sample matrix (with size of the matrix depending on the number of receiver antennas), and $f(n)$ is a radio channel coefficient vector at instant n also known by the frequency offset estimator 414. The known parameters of the radio channel may be a result of a channel property estimation procedure, or the parameters may be measured.

The equations above are calculated for each of the N time instants, and the estimate for the frequency offset resulting from the last calculation of $\hat{\varepsilon}(N|N)$ is the final estimate for frequency offset, which is used for tuning the local oscillator 416 for the duration of the data packet 500.

It is also possible to use the frequency offset estimator described above in systems which comprise multiple antennas in a transmitter and in a receiver and in which each transmission path between an antenna element of the transmitter and an antenna element of the receiver is considered to be one radio channel through which a radio signal carrying data may be transmitted. For instance, as discussed above, the receiver 340 illustrated in FIG. 4 may include one or more antennas 401. This means that when both the transmitter and the receiver comprise for example two antennas, there would be four different radio channels exist between the transmitter and the receiver, and a different data stream could be transmitted through each of these radio channels. This type of transmission of data is referred to as multiple input multiple output (MIMO) transmission.

Figure 6:
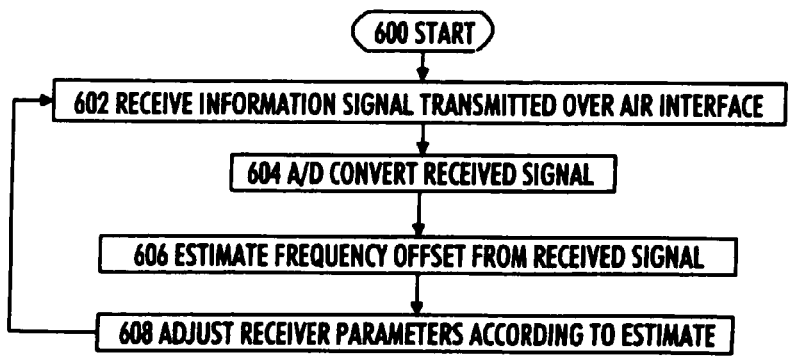
FIG. 6 is a flow diagram illustrating a procedure for estimating frequency offset from a received signal.

FIG. 6 illustrates a procedure for estimating frequency off-set from a received signal. The process starts in 600. An information signal transmitted over an air interface is received in 602. The information signal may be received in data packets similar to those described in FIG. 5 with a data packet comprising a preamble and a payload of data symbols, each symbol preceded by a cyclic prefix.

The received signal is converted into a digital form in 604. A frequency offset estimate for the received signal is provided in 606. The estimate may be obtained from the preamble of a received data packet by calculating the equations above as described. After obtaining an estimate for frequency offset, parameters of the receiver are adjusted in 608. The adjusted parameters may comprise the frequency of the local oscillator, which is used for downconverting a received RF signal.

The radio receiver 200 of the type described above may be used for implementing the methods, but also other types of radio receivers may be suitable for the implementation. In an embodiment, a computer program product encodes a computer program of instructions for executing a computer process of the above-described method for estimating frequency offset in a radio telecommunication system. The computer program product may be implemented on a computer program distribution medium. The computer program distribution medium includes all manners known in the art for distributing software, such as a computer readable medium, a program storage medium, a record medium, a computer readable memory, a computer readable software distribution package and a computer readable compressed software package.

Figure 7:
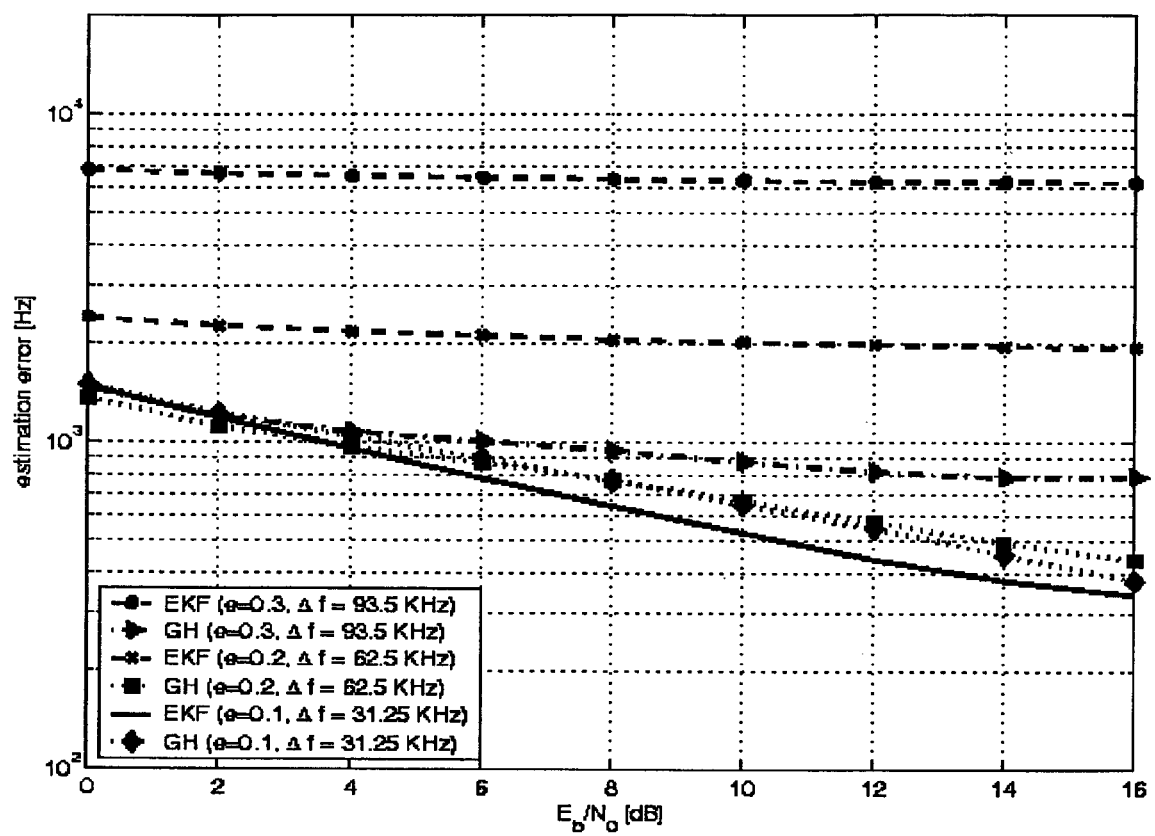
FIG. 7 illustrates performance of the proposed frequency offset estimation procedure.

The performance of a proposed frequency offset estimator was evaluated through computer simulations. FIG. 7 shows an absolute frequency offset estimation error at different frequency offsets $\Delta f$ (or, equivalently, normalized frequency offsets e) over a quasi-static radio channel. The channel parameters were known in the receiver and preamble symbols were used for frequency offset estimation. The performance of the proposed scheme was compared to the performance of an Extended Kalman filter. The absolute frequency offset estimation error was simulated as a function of signal energy over the noise level of the radio channel ($E_b/N_o$), i.e. signal-to-noise ratio. Especially at reasonably high frequency offsets, the proposed scheme provides a considerably better performance than the EKF.

Even though the invention has been described above with reference to an example according to the accompanying drawings, it is clear that the invention is not restricted thereto but it can be modified in several ways within the scope of the appended claims.

The invention claimed is:

1. A method, comprising performing, in a radio receiver, the following:
   receiving a signal transmitted over an air interface, wherein the signal comprises a set of received signal samples;
   initializing a frequency offset estimate with a predetermined value;
   calculating, for each of the set of received signal samples, a frequency offset estimate by utilizing an approximation of Gauss-Hermite integration, and by taking into account previous values for the frequency offset estimate calculated for a preceding received signal sample; and
   adjusting parameters of a radio receiver according to the frequency offset estimate calculated for a last received signal sample of the set of received signal samples to retrieve information from the received signal.

2. The method of claim 1, wherein the method utilizes multicarrier technology.

3. The method of claim 2, wherein the multicarrier technology comprises orthogonal frequency division multiplexing technology.

4. The method of claim 1, wherein the received signal comprises a preamble, from which the frequency offset estimate is calculated.

5. The method of claim 1, wherein the frequency of the local oscillator of the receiver is adjusted according to the frequency offset estimate.

6. An apparatus, comprising:
a controller configured to
receive, from a communication interface, an information signal transmitted over an air interface, wherein the signal comprises a set of received signal samples; and
initialize the frequency offset estimate with a predetermined value;
calculate, for each of the set of received signal samples, a frequency offset estimate by utilizing an approximation of Gauss-Hermite integration, and by taking into account previous values for the frequency offset estimate calculated for a preceding received signal sample; and
adjust parameters of a radio receiver according to the frequency offset estimate calculated for a last received signal sample of the set of received signal samples to retrieve information from the received signal.

7. The apparatus of claim 6, wherein the communication interface comprises multiple antennas configured to receive data transmitted using the multiple antennas.

8. The apparatus of claim 6, wherein the controller is configured to receive, from the communication interface, an information signal transmitted using multicarrier radio access technology.

9. The apparatus of claim 8, wherein the controller is configured to receive, from the communication interface, an information signal transmitted using orthogonal frequency division multiplexing radio access technology.

10. The apparatus of claim 6, wherein the controller is further configured to adjust the frequency of the local oscillator of the apparatus according to the frequency offset estimate.

11. An apparatus, comprising:
receiving means for receiving an information signal transmitted over an air interface, wherein the signal comprises a set of received signal samples;
initializing means for initializing a frequency offset estimate with a predetermined value;
calculating means for calculating, for each of the set of received signal samples, a frequency offset estimate by utilizing an approximation of Gauss-Hermite integration, and by taking into account previous values for the frequency offset estimate calculated for a preceding received signal sample; and
adjusting means for adjusting parameters of a radio receiver according to the frequency offset estimate calculated for a last received signal sample of the set of received signal samples to retrieve information from the received signal.

12. A computer program embodied on a computer-readable storage medium, the program configured to control a processor to perform a process, the process comprising:
receiving a signal transmitted over an air interface, wherein the signal comprises a set of received signal samples;
initializing a frequency offset estimate with a predetermined value;
calculating, for each of the set of received signal samples, a frequency offset estimate by utilizing an approximation of Gauss-Hermite integration, and by taking into account previous values for the frequency offset estimate calculated for a preceding received signal sample; and
adjusting parameters of a radio receiver according to the frequency offset estimate calculated for a last received signal sample of the set of received signal samples to retrieve information from the received signal.

13. The computer program of claim 12, wherein the computer-readable storage medium comprises a distribution medium, a program storage medium, a record medium or a computer readable memory, wherein the computer program is configured to store a computer readable software distribution package and a computer readable compressed software package.

14. The computer program of claim 12, wherein the process utilizes multicarrier technology.

15. The computer program of claim 14, wherein the multicarrier technology is orthogonal frequency division multiplexing technology.

16. The computer program of claim 12, wherein the received signal comprises a preamble, from which the frequency offset estimate is calculated.

17. The computer program of claim 12, wherein the frequency of the local oscillator of the receiver is adjusted according to the frequency offset estimate.

* * * * *

UNITED STATES PATENT AND TRADEMARK OFFICE
CERTIFICATE OF CORRECTION

PATENT NO. : 7,606,331 B2  Page 1 of 1
APPLICATION NO. : 11/126400
DATED : October 20, 2009
INVENTOR(S) : Kyeong Jin Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1100 days.

Signed and Sealed this

Fifth Day of October, 2010

David J. Kappos
*Director of the United States Patent and Trademark Office*